United States Patent
He et al.

(10) Patent No.: US 6,671,259 B1
(45) Date of Patent: Dec. 30, 2003

(54) METHOD AND SYSTEM FOR WIDE AREA NETWORK LOAD BALANCING

(75) Inventors: Jingsha He, Plano, TX (US); Tomohiko Taniguchi, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/281,359

(22) Filed: Mar. 30, 1999

(51) Int. Cl.[7] .................. G01R 31/08; G06F 11/00; G08C 15/00; H04J 1/16; H04J 3/14
(52) U.S. Cl. ............... 370/238; 370/238.1; 370/235; 370/236.1; 370/237; 709/105; 709/228; 709/229; 455/453
(58) Field of Search ................ 370/400–408, 370/389, 392, 466, 468, 399, 237, 238, 238.1, 395.5, 401, 235–236; 709/105, 244, 229, 228, 224, 225; 455/453

(56) References Cited

U.S. PATENT DOCUMENTS

| | | | | |
|---|---|---|---|---|
| 5,774,660 A | * | 6/1998 | Brendel et al. | 709/105 |
| 6,128,279 A | * | 10/2000 | O'Neil et al. | 370/229 |
| 6,223,206 B1 | * | 4/2001 | Dan et al. | 709/105 |
| 6,259,705 B1 | * | 7/2001 | Takahashi et al. | 370/235 |
| 6,263,368 B1 | * | 7/2001 | Martin | 709/105 |
| 6,266,335 B1 | * | 7/2001 | Bhaskaran | 370/399 |
| 6,324,580 B1 | * | 11/2001 | Jindal et al. | 709/228 |
| 6,327,622 B1 | * | 12/2001 | Jindal et al. | 709/228 |
| 6,400,687 B1 | * | 6/2002 | Davison et al. | 370/236 |

* cited by examiner

Primary Examiner—Wellington Chin
Assistant Examiner—Chuong Ho
(74) Attorney, Agent, or Firm—Christie, Parker & Hale, LLP

(57) ABSTRACT

A system and method of load balancing a network having a plurality of client systems and servers. The load balancing system and method distributes requests from the client systems to different servers on a wide area network by selecting the most optimal server for a specific client request. The client request for a server is received from a client system and the destination point of the client request is resolved in part by a load balancing server selector. The client request is sent to a load balancing server based on the resolved destination point and one server out of a subset of the plurality of servers is selected based on a predetermined criteria, such as network traffic congestion or server load, and a conduit to the client system and the selected server for transmission of the client request is provided.

34 Claims, 7 Drawing Sheets

METHOD AND SYSTEM FOR WIDE AREA NETWORK LOAD BALANCING

BACKGROUND OF THE INVENTION

The present invention relates generally to network load balancing systems and methods, and in particular to methods and systems for selecting one server among many servers in a network by using network measurements and a request by a client system.

A conventional network is made up of a plurality of network components or nodes, such as computing devices, e.g., personal computers, workstations and other similar devices. A limited number of network components and devices on a network spanning a relatively small area is called a local area network (LAN) In a LAN, most computing devices operate independently of each other, and most computing devices are able to access data or other network components anywhere on the LAN. A client system represents one such computing device.

The LAN allows for many client systems to share resources, such as printers or data storage equipment. A server is a managerial computing device that manages these shared network resources. Examples of servers include file servers that are dedicated to storing and retrieving files from a storage device, print servers that manage several printers, and application servers that are dedicated to execute only specific types of applications, such as hardware or software development tools.

Interconnecting the client systems and the servers are a series of cables, such as twisted-pair wire, coaxial cables, or fiber optic cables, and network devices, such as routers, switches, and repeaters. Conventionally, when a client system wants a task to be performed, it seeks a server to perform the task. Through the cables and network devices, the client system conveys its request to a server. If the server accepts the task, the server performs the task, and thereby transfers information to and from the client system. A server, however, does not have to be located in the same LAN as the client system.

One LAN can be connected to other LANs over any distance via telephone lines and radio waves. A collection of LANs connected in this manner is referred to as a wide-area network (WAN). A collection of WANs connected to other LANs and WANs is also referred to as a WAN. The largest WAN is the Internet which is a global network connecting millions of computing devices. Therefore, client systems are capable of accessing servers and client systems anywhere on WAN.

However, in a WAN, the total number of client systems easily outnumbers the total number of servers. Therefore, a server can easily get bombarded by a tremendous number of client requests and can thus get overwhelmed. Thus, many times numerous distinct servers are utilized in a manner such that any one of the distinct servers may respond to any specific request. Thus, many parallel servers may be available to respond to client requests, and these servers are sometimes allocated in a round robin fashion to process client requests. However, requests may be of varying nature, both in terms of required communication bandwidth and required extent of processing. Accordingly, specific servers may become overwhelmed.

SUMMARY OF THE INVENTION

In order to reduce or regulate this server congestion, the present invention provides a load balancing system and method which distributes the client request to different servers on the WAN by selecting the most optimal server for a specific client request. The load balancing system causes no or minimal disruption to the client systems, servers and network devices. Since in a WAN the client systems, servers and network devices can number in the thousands or millions, minimal or no effect on the client systems, servers and network devices is preferred.

Also, the load balancing system and method is not limited to a specific location on the network, and thus, allows the flexibility of allowing installation or utilization of the load balancing system and method anywhere on the network. Furthermore, the load balancing system is not limited to any particular size of the network, i.e, a LAN, a WAN or even the Internet.

According to the present invention, load balancing for a network is provided. The network has a plurality of client systems and servers. A client request for a server from a client system is received. A destination point of the client request is resolved and the client request is sent to a load balancing server based on the resolved destination point. One server out of a subset of the plurality of servers is selected based on a predetermined criteria. A conduit to the client system and the selected server for transmission of the client request is provided.

In one embodiment, load balancing system for a network is provided. The network has a plurality of client systems and a plurality of servers. At least one load balancing server adapted to be coupled with the network and at least one load balancing server selector coupled with the at least one load balancing server is also provided. The load balancing server selector is adapted to receive requests from the client systems and to forward the requests to the at least one load balancing server. The at least one load balancing server selects one server out of a subset of the plurality of servers based on a predetermined criteria and the requests from the client systems.

Many of the attendant features of this invention will be more readily appreciated as the same becomes better understood by reference to the following detailed description considered in connection with the accompanying drawings.

DETAILED DESCRIPTION OF THE INVENTION

Figure 1:
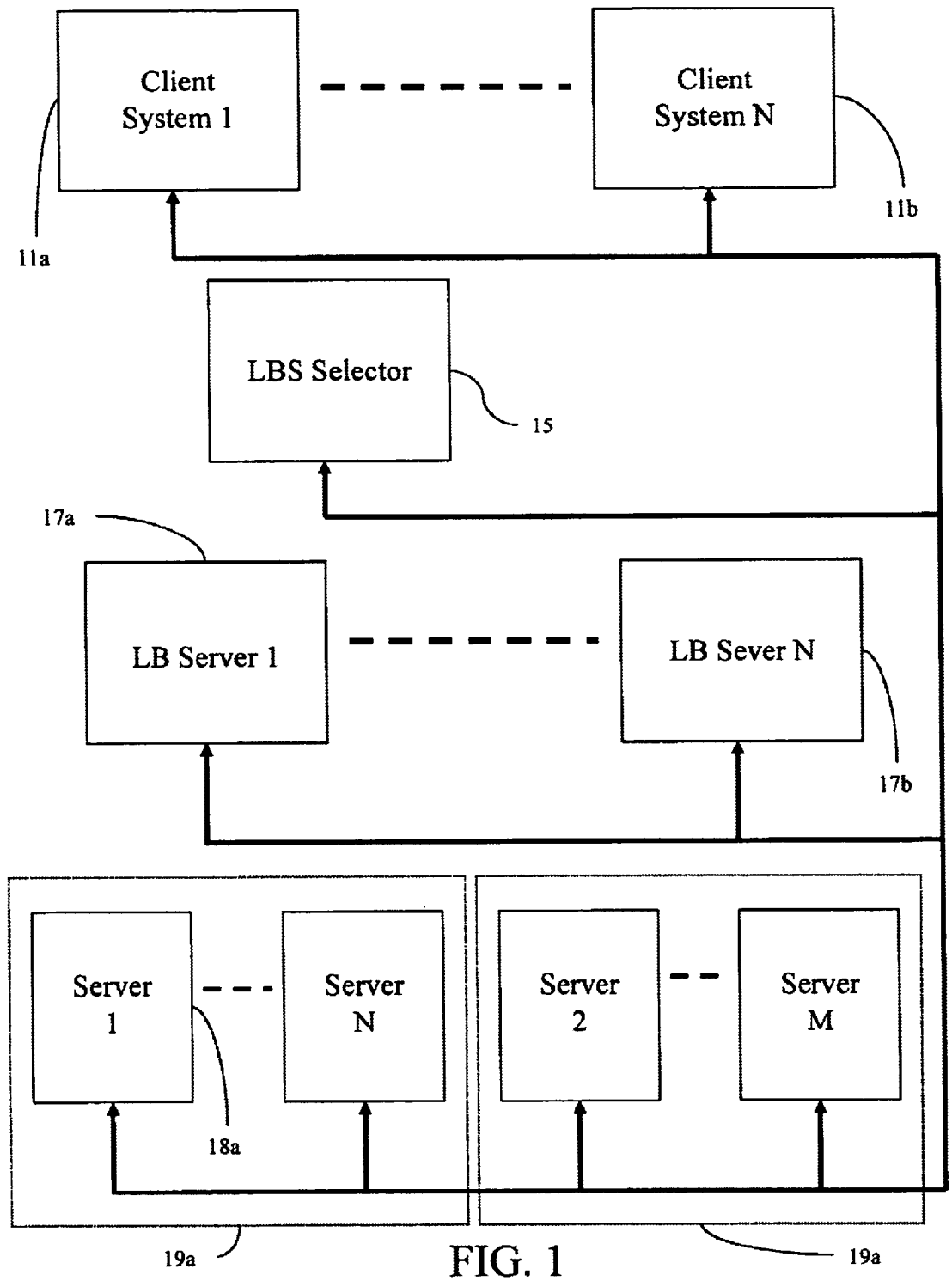
FIG. 1 illustrates a block diagram of an abstract model of a network incorporating the present invention.

The present invention provides a system and a method of load balancing for a network using load balancing server (LBS) selectors and/or load balancing (LB) servers. FIG. 1 illustrates a block diagram of an abstract model of a network incorporating the present invention. The abstract model includes a plurality of client systems 11a,b. For illustrative purposes the number of client systems is limited, as it should be recognized that the number of client systems may be exceedingly numerous. The client systems 11a, b are connected to a network. The network is an interconnection of computer systems. In the embodiment illustrated in FIG. 1, the interconnection of computer systems represents the Internet. In alternative embodiments, the interconnection of computer systems is a wide area network, a local area network or an intranet. Via the network, the client systems are connected to a plurality of other systems. As illustrated, these other systems include a load balancing server (LBS) selector 15, a first and second load balancing (LB) server 17a,b, and a plurality of servers 19a,b.

In fact, the interconnections between all the components in the network illustrated in FIG. 1 varies. For instance, in one case, the client system 11a is directly connected to an LBS selector 15 through a single cable. In another case, the client system 11a is connected to the LBS selector 15 through a series of fiber optic cables and wires intertwined with several network devices, such as routers and switches, and other systems to eventually be connected to the LBS selector 15. The other systems connected to the client systems include a number of servers from which a particular client system is able to extract information or provide information to a particular server.

For convenience, the servers are illustrated in two groups, a first group 19a and a second group 19b. Each of the servers which make up group 19a are equivalent servers. That is, the servers which make up group 19a each perform the largely same functions and provide largely the same services. Such a group of servers is desirable, for example, when due to system needs a single server provides insufficient or communication processing bandwidth. Similarly, each of the servers of group 19b are also largely equivalent servers.

The client systems are, as previously mentioned, also connected to the LBS selector 15 and the two LB servers 17a,b. As is discussed more fully below, the LB server balances network traffic and load amongst the servers of a group of servers. The LBS selector, on the other hand, determines which LB server is responsible for balancing loads for which groups of servers. Thus, requests to communicate with servers by the client system are, generally speaking, referred to the LBS selector, which in turn refers the request to a specific LB server. The LB server then arranges for communications between one of the servers and the client system. Depending on various factors, such as the load on the LB server, the LB server either allows the client system to directly contact a specific server or provides specific server information on a per session basis.

More concretely, the client systems 11a,b send requests to the LBS selector 15. One example of a request sent by a client system is a request for a server on the network to perform a specific task. One such specific task is a request for domain name resolution, which is a request for resolving a logical name of a system, e.g. a server, to a unique series of numbers. This unique series of numbers is an Internet Protocol (IP) number. The IP number is the address of a particular server, and allows messages, sent in packets, to be routed from one system to another in the network.

A request by a client system for domain name resolution is routed to the LBS selector 15. The LBS selector resolves, or interprets, the request from the client system to determine the appropriate LB server for the request. The LB server then selects one of the servers amongst a group of servers to receive the client request. In turn, the selected server performs the task required by the client system.

The LB server selects the selected server so as to balance tasks among the group of servers. In one embodiment of the present invention, the server selected by the LB server is based on network measurements gathered and the request originally sent by the client system. The network measurements are performed on each of the servers or gathered from each server using network measurement devices and techniques. Such devices and techniques are known in the art. In the present invention, the network measurements includes the measurement of load or network traffic experienced by a server. Load refers to the total amount of client requests which the server is servicing or the total amount of operations being performed by a server. Network traffic is the total amount of data packets (traffic on the network) being carried to each of the servers from the client systems, as well as, from each of the servers to the client systems. Other similar network measurements are gathered or determined in the present invention. By examining the network load measurements, the LB server is able to select the most optimal server for the client request.

Thus, in one embodiment of the LB Server of the present invention, the LB Server characterizes or categorizes each of the servers based on the network load measurements. For instance, if server 18a is experiencing hundreds of client requests within a given time period, server 18a is categorized as a high load server. Conversely, if server 18a is experiencing ten or twenty client requests within a given time period, server 18a is categorized as a low load server. Therefore, the servers based on the network measurements gathered can be categorized or ranked in order, from a low load server to a high load server. Similarly, using network traffic as the network measurement, i.e., measuring the total amount of bytes of information transferred to and from a server, each of the servers are categorized. Hence, the servers connected to the LB servers are ranked in order, from a low network traffic server to a high network traffic server.

Using the categorization or ranking of the servers, the LB servers 17a,b selects an appropriate server from the group of servers 19a and 19b. In one embodiment of the LB server, the LB server selects the lowest load server to handle the client requests. For instance, if the LB server 17a received the client request from the LBS selector 15 and the lowest load server was server 18a, the LB server 17a would select the server 18a to handle the client request.

Figure 2:
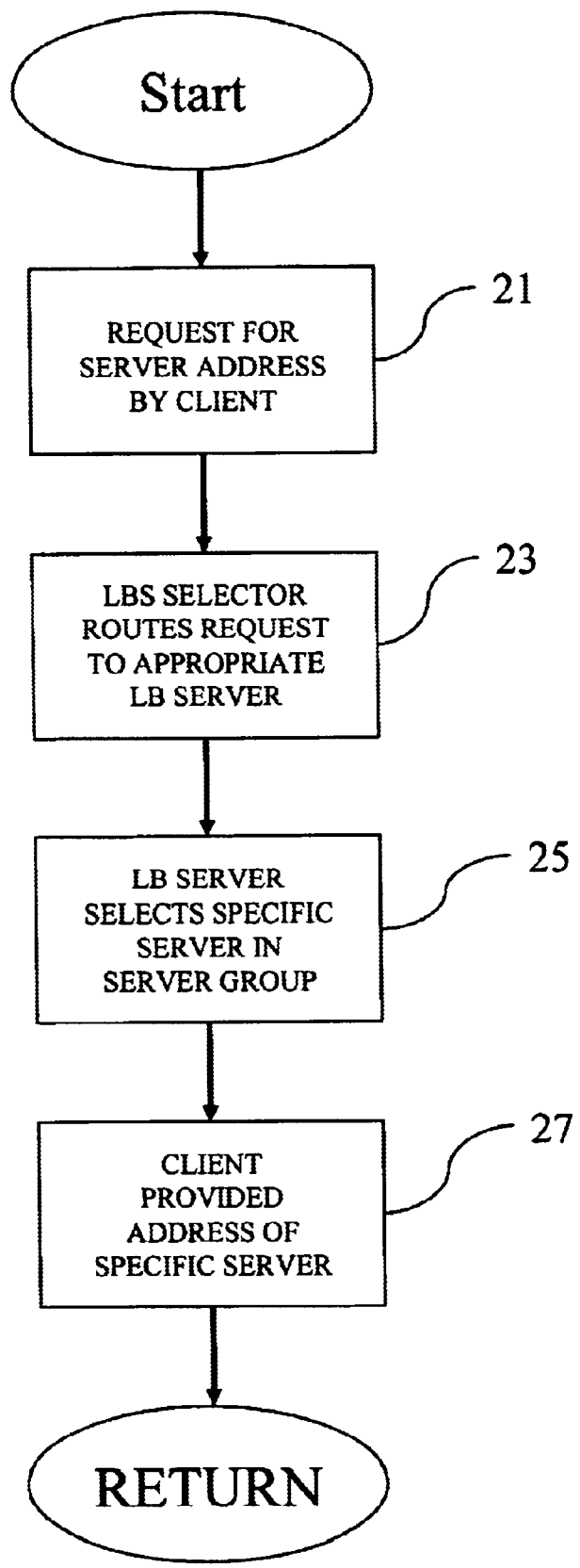
FIG. 2 illustrates a flow diagram of an operational overview of the abstract model illustrated in FIG. 1.

FIG. 2 illustrates a flow diagram of an operational overview of the abstract model illustrated in FIG. 1. In step 21, a client system requests a specific server address. In step 23, an LBS selector resolves the client request to determine the destination point, i.e., server, that is requested by the client system, and routes the client request to a specific LB server. In step 25, the LB server receives and resolves the client request and the LB server selects a specific server out of a server group based on a predetermined criteria. In step 27, the process provides a location (address) of the specific server selected and provides the address to the client system which initiated the client request.

Figure 3:
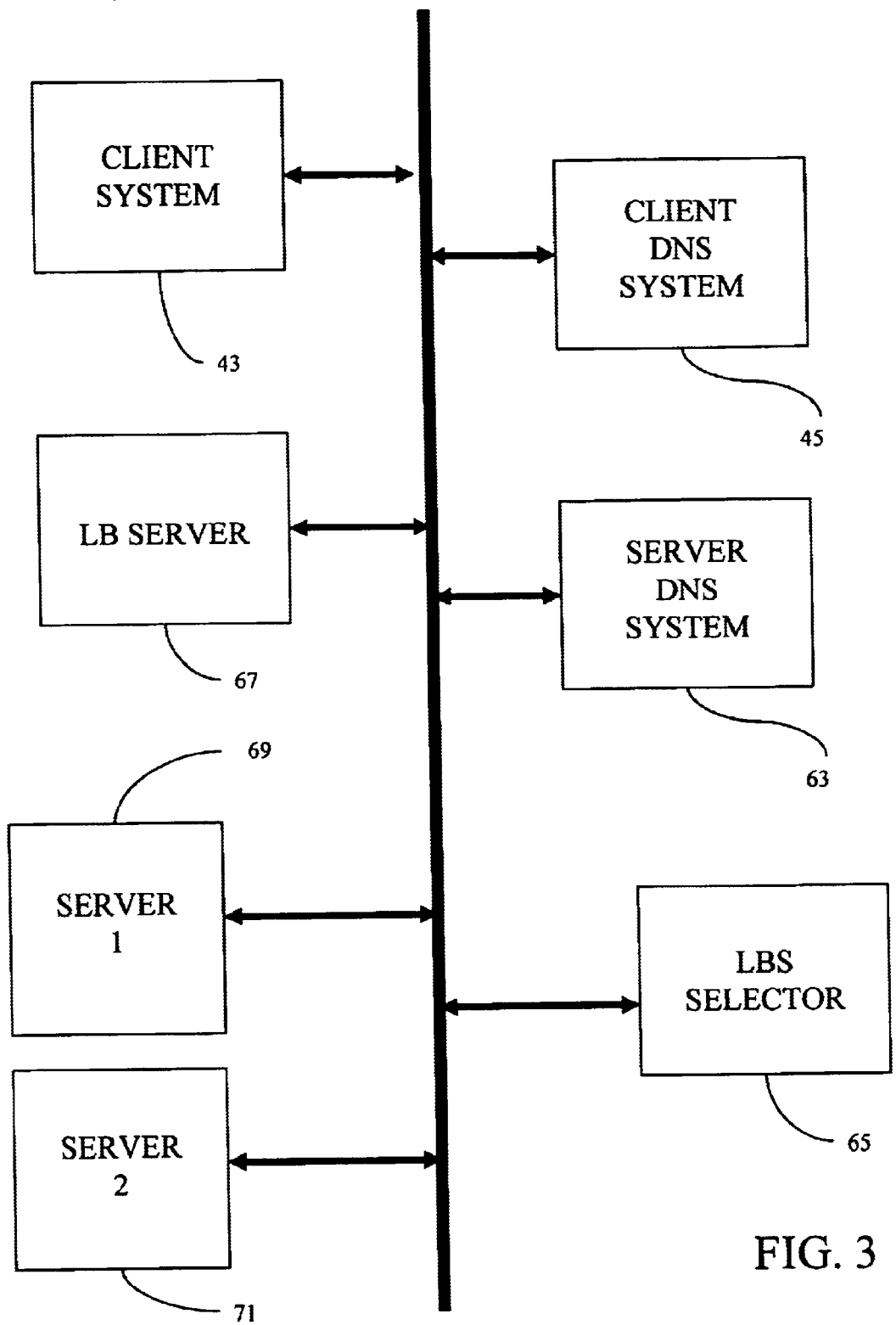
FIG. 3 illustrates a block diagram of one embodiment of the load balancing system in a typical network.

FIG. 3 illustrates a block diagram of one embodiment of the load balancing system in a typical network. For the sake of clarity of description, a single client system 43, a single LBS selector 65, a single LB server 67, and two servers 69 and 71 are depicted in FIG. 3. The total number of client systems, LBS selectors, LB servers and servers, however, may vary according to different embodiments of the invention. As illustrated in FIG. 3, a client system 43 is coupled with a client DNS system 45. The client system sends client requests, e.g. domain name resolution requests, that is received by the client DNS system. The client DNS system, using a domain naming system/service (DNS), resolves the client request.

DNS is an Internet/Network service that translates domain names into Internet Protocol (IP) addresses or numbers. A domain name is a logical name, such as www.fujitsu.com, representing a network component on the network such as a client system, a server or an LBS selector. Since domain names are alphabetic and resemble words, domain names are easier to remember and thus preferred versus using IP numbers. Also, the domain name is a unique identifier of the network component such that a domain name only represents one network component on the network. However, more than one domain name can be given to the same network component. A domain name server, such as the client DNS 45, translates or resolves the domain name into an IP number. This IP number is a unique number consisting of four sets of numbers separated by dots. For example, the domain name www.fujitsu.com resolves to 133.164.254.100. Hence, each network component on the network has a unique IP number.

Furthermore, a domain name and an IP number represent a domain. Domain names and IP numbers that contain common sections, such as ".com", are considered to be part of the same domain. In terms of network components, e.g. client systems, a domain is a group of network components on a network, administered as a unit having common rules and procedures. In many ways, a domain is its own network. For instance, if one DNS system doesn't know how to resolve a domain name, a second DNS system is consulted or transmitted the domain name for the second DNS system to attempt to resolve the domain name. If the second DNS system is unable to resolve the domain name, a third DNS system, a fourth DNS system, and so, is consulted, until the IP number corresponding to the domain name is found. If the domain name is not found after consulting all the appropriate DNS systems an error is returned to the client system or the client system, after a period of time has passed, e.g. fifteen seconds, assumes that the domain name cannot be resolved.

Referring back to FIG. 3, the client DNS system 45 using DNS, i.e., the domain resolution hierarchy described above, determines that the client request cannot be resolved by the client DNS. Therefore, the client DNS 45 attempts to consult with the server DNS system 63, i.e., the client DNS 45 forwards the client request to the server DNS 63. The server DNS 63 resolves the client request by providing the IP number of the LBS selector 65. The client DNS 45 in response to the IP number sent by the server DNS 63 forwards the client request to the LBS selector 65. The LBS selector 65 examines the client request sent by the client DNS 45 to select a LB server and to forward the client request to that LB server. In one embodiment, the LBS selector 65 resolves the client request and provides the IP number of the LB server 67 to the client DNS 45. The client DNS 45 sends the client request to the LB server 67 in response to the IP number provided by the LBS selector 65. The LB server 67 examines the client request and the network measurements provided for the servers 69 and 71.

Based on the network measurements and the client request, the LB server 67 determines the best server for handling the client request. Once the determination is made by the LB server 67 and a server is selected, the LB server provides an IP number to the client system 43. Using the provided IP number, the client system directs its request to that IP number. In one embodiment of the LB server using macro-control mode, the IP number provided is a destination point or location of the server on the network. The client system directs its requests directly to the chosen server. In another embodiment of the LB Server using micro-control mode, the IP number provided is a conduit or path. In other words, the LB server opens a conduit or provides a path from the client system to the selected server and the LB server acts as a gatekeeper. Micro-control and macro-control mode is presented in more detail later in the context of FIG. 6.

Figure 4:
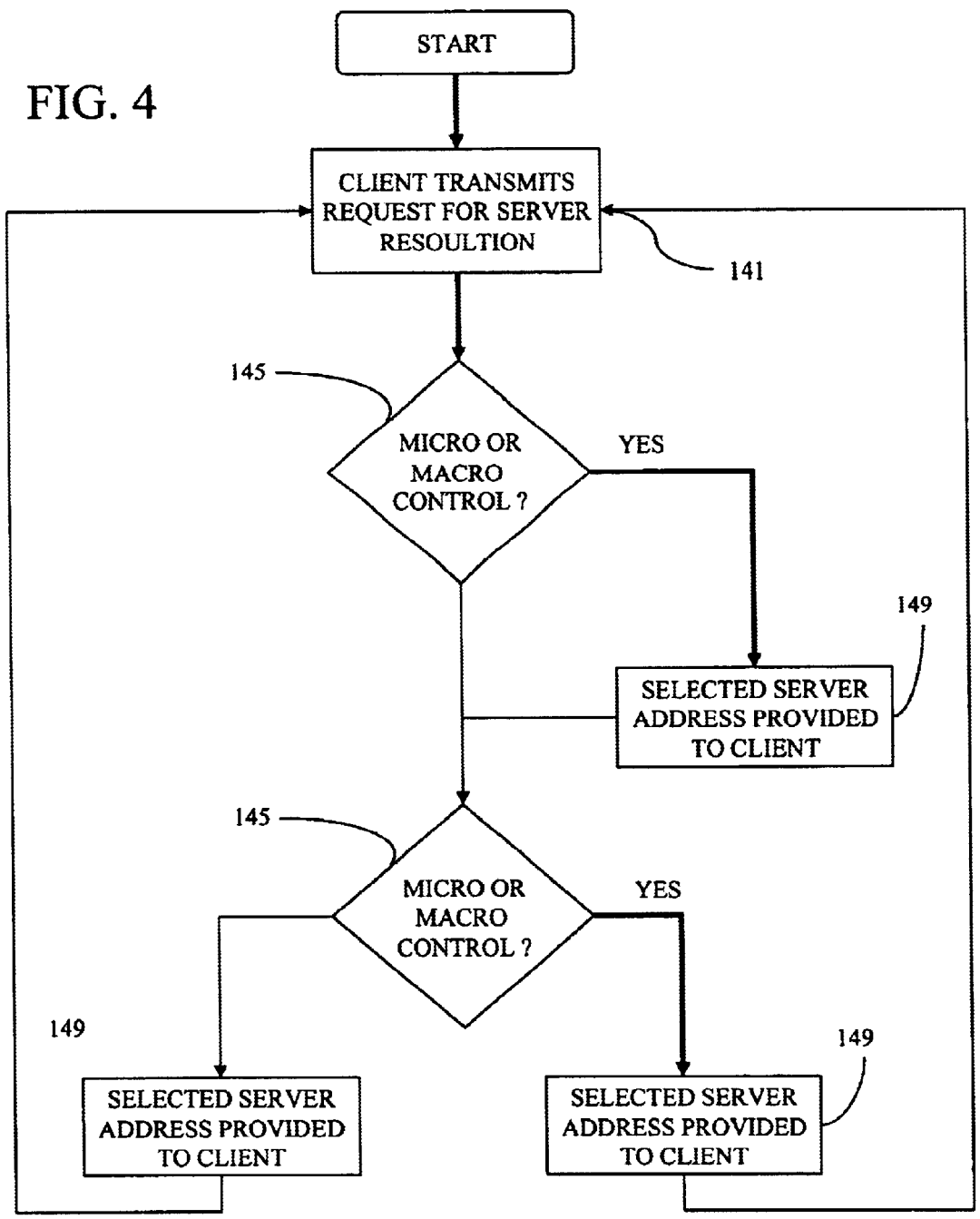
FIG. 4 illustrates a flow diagram of an operational overview of one embodiment of the load balancing system illustrated in FIG. 3.

FIG. 4 illustrates a flow diagram of an operational overview of one embodiment of the load balancing system illustrated in FIG. 3. The client system sends a request for server resolution, i.e., a domain name resolution request, in step 141. In step 143, server resolution occurs such that one or more DNS systems resolves the domain name requested by the client system. Once server resolution is completed, in step 145, the LB server is dynamically configured to work in macro or micro-control mode. If the LB server is dynamically configured to work in macro-control mode, then in step 149, the selected server IP number is provided to the client system and the process ends. If the LB server is dynamically configured in micro-control mode then in step 147, the LB server provides an IP number of the LB server to the client system for a path from the client system to a server through the LB server. The LB server acts as a gatekeeper between the client system and the selected server. Once an IP address is provided to the client system, the process ends.

Figure 5:
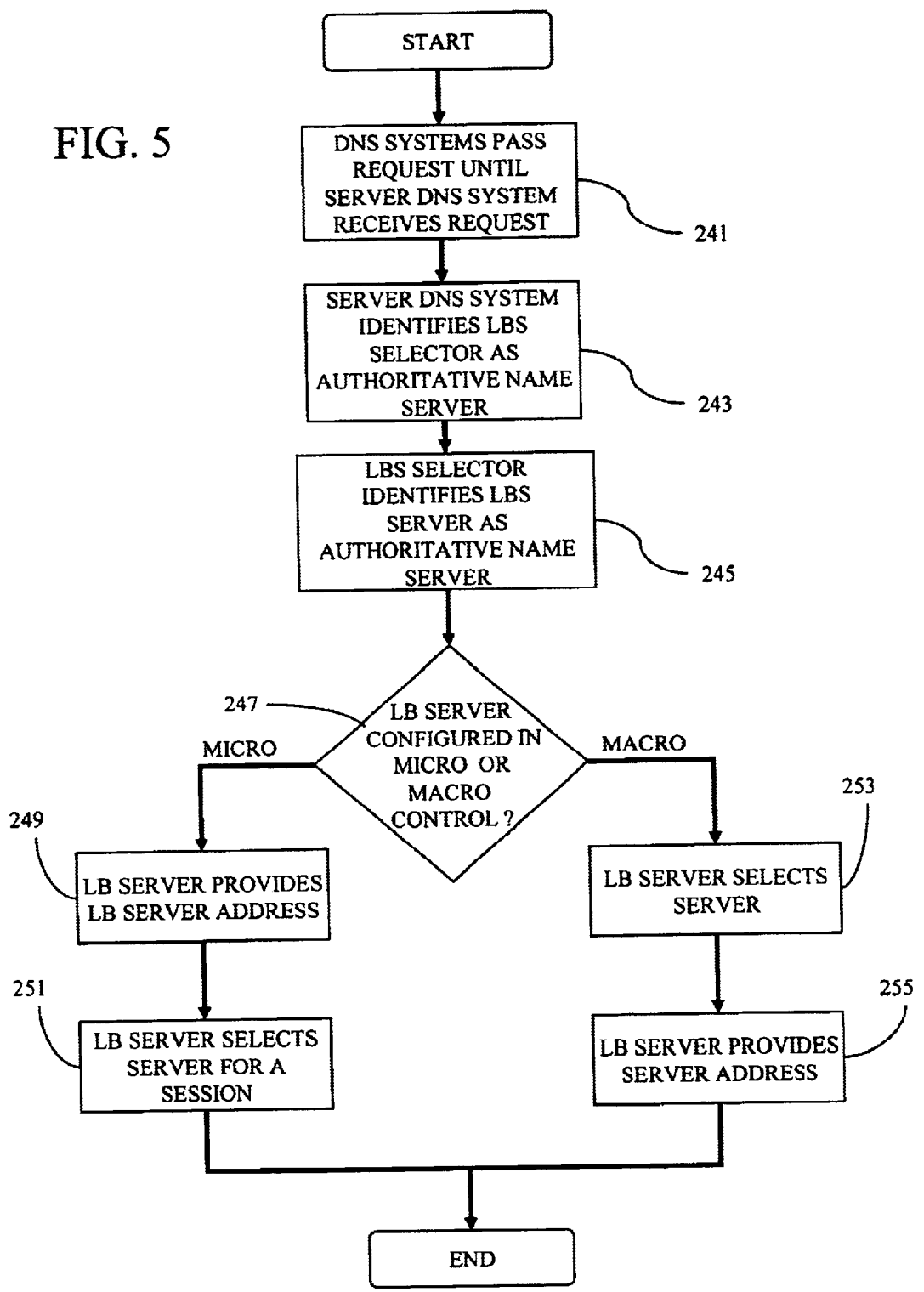
FIG. 5 illustrates a flow diagram of one embodiment of the load balancing system performing server resolution illustrated in the flow diagram in FIG. 4.

FIG. 5 illustrates a flow diagram of the step 143 illustrated in the flow diagram in FIG. 4. In step 241, the client system sends a request for server resolution and the request, is examined by a DNS server. If the DNS server cannot resolve the request, the DNS server passes the client request to another DNS server until a server DNS receives the client request. In step 243, the server DNS resolves the client request by identifying an LBS selector as the authoritative name server. An authoritative name server is a server capable of resolving a domain name into an IP number without consulting another server. In step 245, the LBS selector resolves the client request and identifies the LB server as the authoritative name server.

In other words, the LBS selector indicates to the client DNS that the LBS selector cannot resolve the domain name of the server the client system is attempting to access. However, the LB server can resolve the domain name. Therefore, the LBS selector provides the IP number of the LB server (the address or "how" to contact of the LB server) that has the information the client DNS is looking for.

In step 247, the LB server is dynamically configured in macro-control mode or micro-control mode. If the LB server is dynamically configured to be in micro-control mode, than in step 249, the LB server provides an IP number of the LB server such that the LB server acts as a gatekeeper between the client system and a server. In step 251, the LB server selects a server for the client system for a given session and then the process ends. A session includes either a predetermined time period such as five minutes, or a time period measured from the start of the client request to the completion of a specific task by the server as requested by the client system. If the LB server is dynamically configured to operate in macro-control mode, the LB server selects a server from a group of servers based on a predetermined criteria in step 253. In step 255, the LB server provides the selected server's IP number to the client system which originally initiated the client request and then the process ends.

Figure 6:
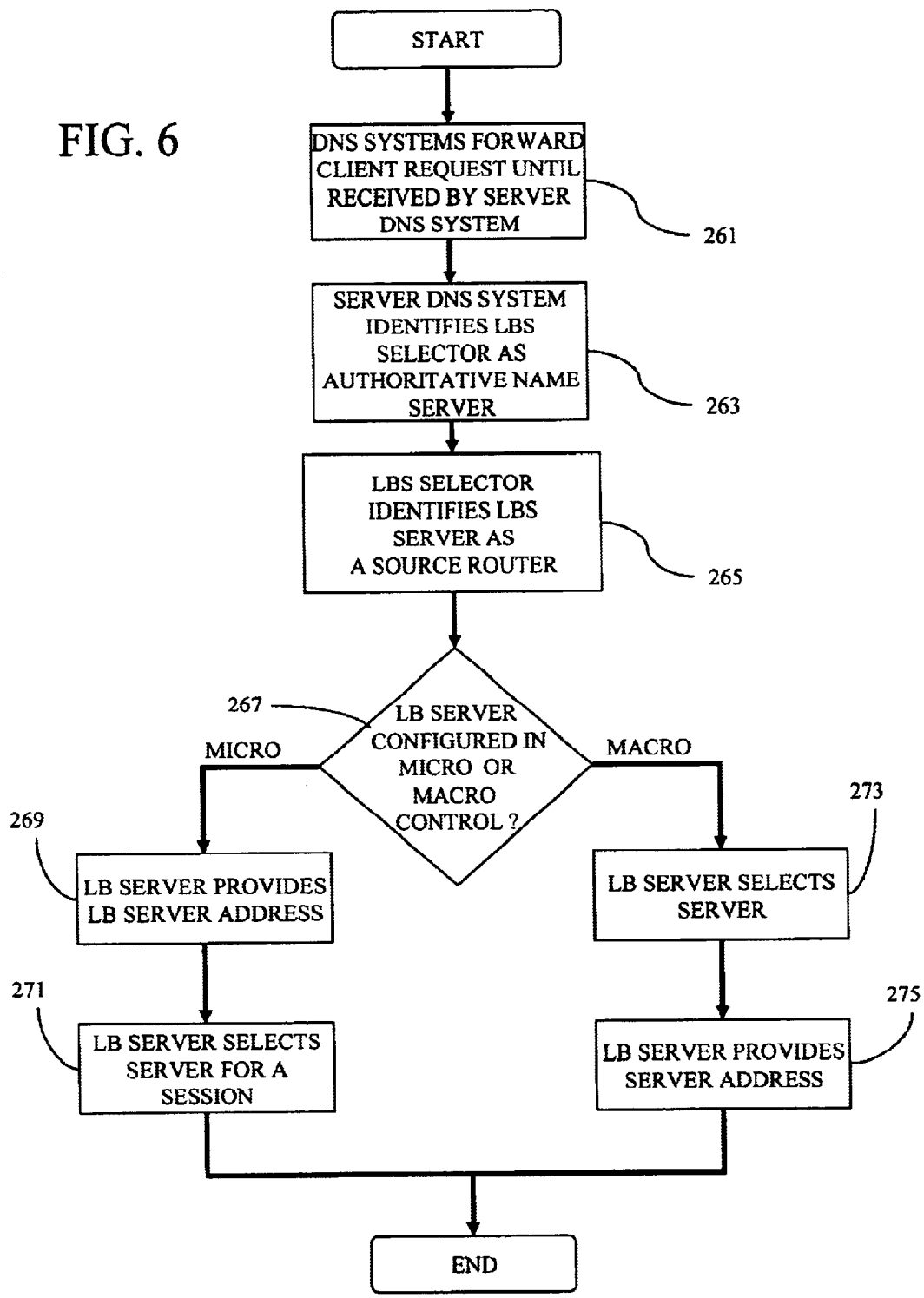
FIG. 6 illustrates a flow diagram of another embodiment of the load balancing system performing server resolution illustrated in the flow diagram in FIG. 4.

FIG. 6 illustrates a flow diagram of another embodiment of the load balancing system performing step 143 illustrated in FIG. 4. In step 261, DNS systems passes the client request to other DNS systems until the server DNS receives the client request. In step 263, the server DNS resolves the client request by identifying an LBS selector as a potential authoritative name server. In step 265, the LBS selector resolves the client request to identify the LB server as a source router. The LB server as a source router, selects one IP number out of a set of IP numbers allocated to the LB server for connecting the client system to a specific server.

In other words, instead of the LBS selector responding to the client request directly to the client DNS, the LBS selector directs the LB server to handle the request. Therefore, the LBS selector refrains from sending a response to a client DNS, since the LB server is handling the response. Also, the LB server is dynamically configured to receive the LBS selector requests to handle the client request.

Alternatively, the LB server is dynamically configured to intercept the LBS selector responses intended for a client DNS. The LBS selector responses are then converted into an IP number either representing a path from the client system to a server with the LB server acting as the gatekeeper or a destination point of the server on the network. For instance, a client request is sent to an LBS selector R1. The LBS selector R1 provides a LBS selector response including the IP number of the LB server I1. In other words, the LBS selector sends a LBS selector response to the LB server I1 to force a response, i.e., a route, from the LB server and back to the client DNS. Hence, the LB server I1 receives the LBS selector response and LB server I1, reconfigures the LBS selector response to include the IP number of a path or destination point to a specific server on the network.

In step 267, the LB server is dynamically configured to operate in either micro-controlled mode or macro-controlled mode. If the LB server is dynamically configured in micro-controlled mode, then the LB server provides the IP number of the LB server to represent a path from the client system to a server with the LB server acting as the gatekeeper in step 269. In step 271, the LB server selects a server for a client system for a specified session and then the process ends. If the LB server is dynamically configured to operate in a macro-control mode, than in step 273, the LB server selects a server according to a predetermined criteria. In step 275, the LB server provides the IP number representing the address of the server selected in step 273 and then the process ends.

In step 265 of the flow diagram illustrated in FIG. 6, the LB server is dynamically configured to operate in micro-control mode or a macro-control mode. Micro-control mode places the LB server in greater control of the flow of information from the client systems to the servers. If the LB server is dynamically configured to be in micro-control mode, the server monitors the information flow on a packet per packet basis and determines the appropriate server to service each packet in step 313. Therefore, the LB server can dynamically change from one server to another quickly and during the same session or connection between the client system and the server. For instance, an LB server initially determines that client system C1 is to be connected to server S1, since server S1 is determined as a low load server and server S2 is determined to be a high load server. During the course of the connection between the client system C1 and server S1, server S1 becomes heavily loaded and server S2 becomes less loaded. Therefore, the server S1 now becomes the high load server and server S2 becomes the low load server. The LB server switches the connection between the client system C1 to the new server S2 on the next client request from the client system. Therefore, the client system is using the "best" server among the two servers based on the conditions at the time a client request is received, with or without knowledge by the client system.

On the other hand, macro-control mode places the LB server in less control of the flow of information from the client systems to the servers. However, this reduces the overhead experienced by the LB server in having to constantly monitor the information flow on a packet per packet basis and determines the appropriate server to service each packet. If the LB server is dynamically configured to operate in macro-control mode, the LB server selects and determines the client system connection with a server prior to establishing any connection between the client system and the server. For instance, LB server initially determines that client system C1 is to be connected to server S1, since server S1 is determined as a low load server and server S2 is determined to be a high load server. During the course of the connection between the client system C1 and server S1, server S1 becomes heavily loaded and server S2 becomes less loaded. Therefore, the server S1 now becomes the high load server and server S2 becomes the low load server. The LB server does not switch the connection between the client system C1 to the new server S2 on the next packet or client request from the client system.

In another embodiment of the LB server, the LB server in micro-control mode is dynamically configured to switch connection between a client system and a server, if so warranted, after a specified period of time has elapsed. For instance, the LB server initially determines that client system C2 is to be connected to server S2, since server S2 is determined as a low load server and server S3 is determined to be a high load server. After a predetermined time period, such as 5 minutes, the LB server examines the network measurements of the servers. If during the course of the connection between the client system C2 and server S2, server S2 becomes heavily loaded and server S3 becomes less loaded. Therefore, the server S2 now becomes the high load server and server S3 becomes the low load server. The LB server switches the connection between the client system C2 to the server S3 on the next packet or client request from the client system.

In another embodiment of the LB server, the LB server is dynamically configured to switch between micro-control mode and macro-control mode based on the LB server's own network measurements. For instance, the LB server initially is receiving a few client requests, e.g. ten or twenty client requests and thereby switches into micro-control mode. After a predetermined time period, such as 5 minutes, or through continues monitoring, the LB server examines the amount of client requests the LB server is receiving. If LB server determines that the LB server is now heavily loaded, e.g. receiving hundreds of client requests, the LB server switches into macro-control mode. Therefore, the LB server dynamically switches from micro-control mode to macro-control mode and vice versa based on the LB server's own network measurements. In other words, the LB server is able to switch into micro-control mode from macro-control mode, and thereby being in greater control of the flow of information from the client systems to the servers, if the LB server is not heavily loaded. Likewise, the LB server is able to switch into macro-control mode from micro-control mode, and thereby being in less control of the flow of information from the client systems to the servers, if the LB server is heavily loaded.

Figure 7:
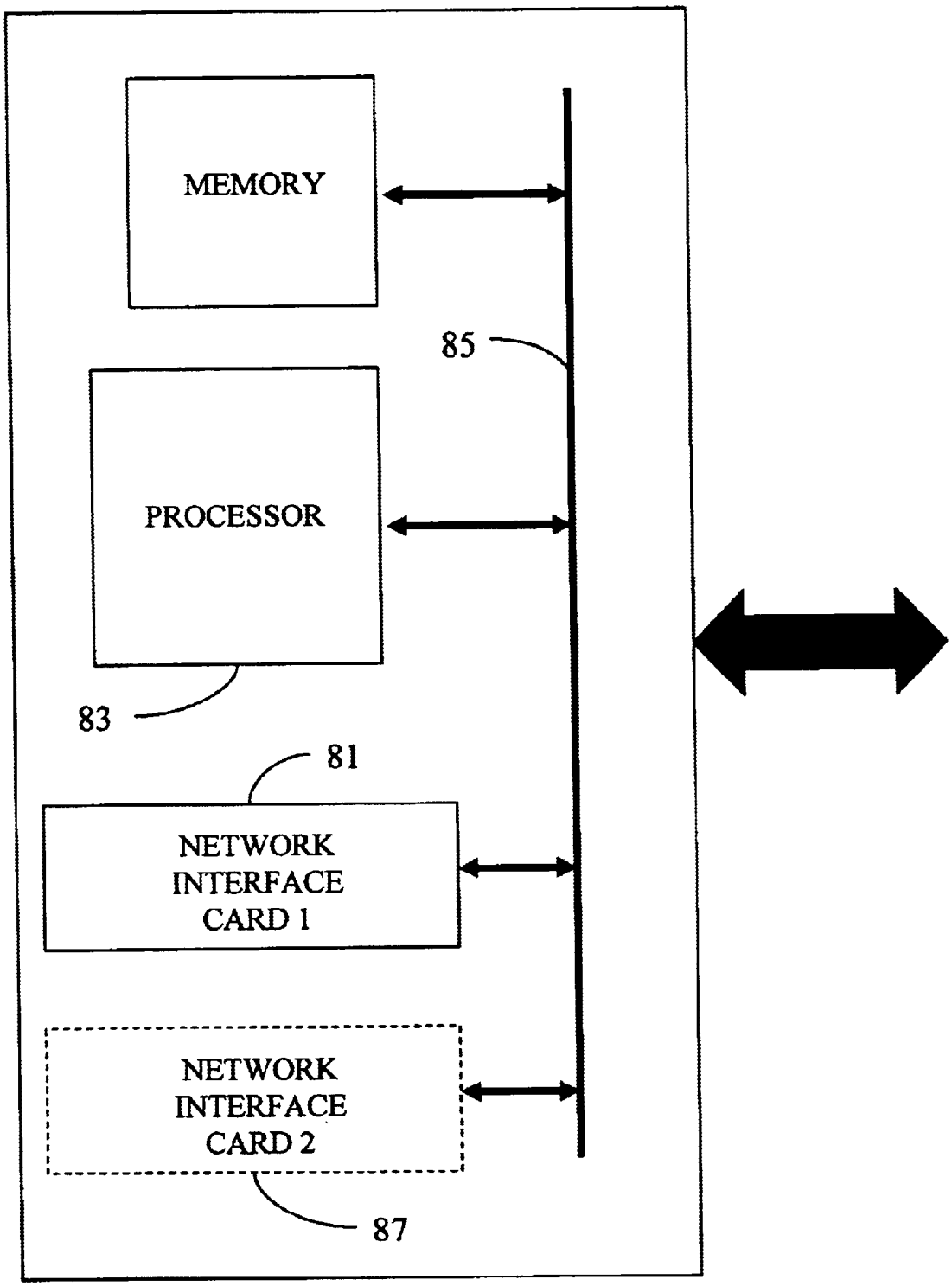
FIG. 7 illustrates a block diagram of one embodiment of the LBS selector and/or LB server of the present invention.

FIG. 7 illustrates a block diagram of one embodiment of the LBS selector of the present invention. In one embodiment, the LBS selector is a standalone network device or a computing device, e.g. a personal computer, programmed with firmware or software. The LBS selector accepts or receives requests from client systems and DNS systems through a network interface card 81 connected to the network. Network interface cards are known in the art. The network interface card 81 sends the client requests to a processor 83 through a system bus 85. The processor is configured with firmware or software to resolve the client request.

In one embodiment of the LBS selector, a data structure is used to create a mapping table to link a client DNS to an LB server. Table 1 illustrates one embodiment of the data structure used by the LBS selector.

TABLE 1

| Client DNS IP | LB Server IP |
|---|---|
| DNS IP1 | LB Server IP1 |
| DNS IP2 | LB Server IP2 |
| . | . |
| . | . |
| . | . |
| DNS IPN | LB Server IPN |

The LBS selector using the data structure allows the LBS selector to quickly look up or refer to the data structure to identify a specific LB server. The data structure shown in Table 1 assigns a single client DNS to be associated with a single LB server. As such, a specific domain or a section within the domain can be isolated. Once the specific LB server is identified, the processor sends the IP number of the identified LB server through the system bus 85 back to the network interface card 81. The network interface card 81 sends the IP number of the identified LB server out into the network and thereby back to the client DNS.

In another embodiment of the LBS selector, a data structure shown in Table 2 is used to create a mapping table to link a client DNS to a series of LB servers.

TABLE 2

| Client DNS IP | LB Server IP |
|---|---|
| DNS IP1 | LB Server IP1, IP2, IP3 |
| DNS IP2 | LB Server IP10, IP11, IP12 |
| . | . |
| . | . |
| . | . |
| DNS IPZ | LB Server IPX, IPY, IPZ |

The first LB server listed is the primary LB server and the next is the LB server listed is the secondary LB server and so on. Similar to the data structure shown in Table 1, the LBS selector using the data structure shown in Table 2 quickly identifies a specific LB server. The client DNS is linked to the primary LB server using the first LB server listed in the data structure. Due to either the load or other network measurements on the primary LB server or a round-robin configuration of the LBS selector, the secondary or next LB server is linked to the client DNS by using the next LB server listed in the data structure. The data structure in Table 2 allows the LBS Selector to be configured to use a LB server as a primary LB server and to use the next server when the primary server is too heavily loaded. Alternatively, the LBS Selector is configured to select servers in a round-robin fashion or the LBS Selector is configured to select the server based on network measurements, similar to the selection performed by the LB server.

FIG. 7 also illustrates a block diagram of the LB Server of the present invention. However, the LBS selector uses two data structures as shown in Table 3.

TABLE 3

| IP1, 0/1, TTL | Server IP1, . . . , IP1N |
|---|---|
| IP2, 0/1, TTL | Server IP21, . . . , IP2N |
| . | . |
| . | . |
| . | . |
| IPN, 0/1, TTL | Server IPM1, . . . , IPMN |

The first data structure contains a plurality of entries with three data fields for each entry. The first data field contains an IP address associated with the LB server. The second data field contains an in use flag indicating that the current IP number is in use or not in use. The third data field is a time to live (TTL) value indicating the total time that a particular link or association will remain "alive" or connected. The second data structure contains a plurality of entries with each entry containing a plurality of data fields. Each data field within the second data structure contains an IP number of a server with an associated logical name of the same server. Each entry provides a grouping of servers. The total number of servers within each entry varies and depends on the desired partitioning or balancing of the load among the servers. Each entry within the second data structure is associated with a corresponding entry in the first data structure. As such, this provides a link between an IP number in the first data structure to a set of servers contained in the second data structure.

FIG. 7 also illustrates a block diagram of one embodiment of a combined LB Server and LBS selector. The combined LBS selector and LB server accepts or receives requests from client systems and DNS systems through a first network interface card 81 and a second network interface card 87 connected to the network. The first network interface card 81 has a different IP address from that of the second network interface card 87. The first network interface card 81 and the second network interface card 87 send the client requests to a processor 83 through a system bus 85 and individually send and receive the client requests from the network. The processor configured with a LBS selector firmware or software and a LB server firmware or software to determine the destination for the client request. Since both the LBS selector software and the LB server software reside on the same computing device, both softwares are able to work together without accessing the network. Therefore, the time needed to determine the destination for the client request is accelerated. Once the specific server is identified, the processor sends an IP address through the system bus back to the second network interface card. The second network interface card sends the server response out into the network and thereby back to the client DNS.

Additionally, additional network interface cards can be added to the combined LBS selector and LB server. With each additional network interface card added, an additional LBS selector or LB server is added. The corresponding LBS selector software and LB server software is additionally updated to handle the additional network cards to be able to identify requests intended for a specific LBS selector and LB server. Therefore, the amount of resources needed is significantly reduced, e.g. no extra processors or computing devices. However, if required, the separation of the LBS selector from the LB server and vice versa, is not easily accomplished.

In one embodiment of the load balancing system, the load balancing system, by utilizing DNS, effectively distributes client requests to different servers. For example, the server DNS or the client DNS does not have to automatically send the client request to the LBS selector. In one embodiment, the server DNS and the user DNS are configured to only route client requests for servers that are being "load balanced". Therefore, this allows for only some of the servers to be load balanced and others not to be load balanced, if so desired. For instance, some servers may be access infrequently because they maybe old or not contain the most heavily used applications. As such, there maybe no need for this server and others like it to be "load balanced". Therefore, the load balancing components, the LBS selector and the LB server can be bypassed. This would save the series of operations of sending and resolving client requests by the LBS selectors and LB servers.

Therefore, if the client requests a server not "load balanced", the server DNS can directly provide the IP number of the server to the client system. However, if the client requests a server "load balanced", the server DNS sends the client request to the LBS selector for resolution. Alternatively, if load balancing is desired, e.g. by the client system, the server DNS sends the client request to the LBS selector for resolution and if load balancing is not desired, the server DNS can directly provide the IP number of the server to the client system.

Furthermore, in one embodiment of the load balancing system of the present invention, DNS caching is provided for the resolving of domain names for network components such as the client DNS, the server DNS, the LBS selector, and the LB server. As such, when a domain name is resolved in a client request, any subsequent client request are resolved in the same fashion. For instance, if the client system C1 requests a server S1, the client DNS resolves the server S1 with the IP number 147.244.54.1 and this resolution is cached or temporarily stored within the client DNS. A subsequent client request for server S1 by client system C1 or any other client system resolves to the IP number stored in the cache of the client DNS. Similarly, the server DNS, LB server, and LBS selector or any combination thereof can be configured with DNS caching. DNS caching reduces the amount of overhead, similar to the LB server's use of macro-control, such that the LB server does not have to constantly resolve client requests.

In another embodiment of the load balancing system of the present invention, the network is configured such that the client DNS skips the sending of the client request to the server DNS, but instead to the LB server. In this case, the client DNS and the LB server handle all domain name resolution requests. In other words, the LB server becomes the primary DNS for the server side of the network. Therefore, the LB server has to handle all the domain name resolution requests to a server even if the server requested not subjected to load balancing. Furthermore, since the LB server acts as the primary DNS, the LBS selector does not have to select a LB server to receive the client request. The client requests are already being sent directly to the LB server.

For instance, the client system transmits a client request, e.g. a domain name resolution request, to the client DNS. If the client DNS cannot resolve the request, the client DNS sends the client request to the LB server. The LB server is on the server side of the network. The LB server receives the forwarded client request from the client DNS. The LB server resolves the client request by examining the client request and the network measurements provided for the servers. Based on the network measurements and the client request, the LB server determines the best server for handling the client request. Once the determination is made by the LB server and a server is selected, the LB server provides an IP number to the client system. Using the provided IP number, the client system directs its request to that IP number.

Also, in another embodiment of the load balancing system of the present invention, the network is configured such that the client system and the servers are in same domain. In other words, there is a single DNS. Since servers and client systems are in the same domain, the server DNS and the client DNS are one in the same. For instance, the client system transmits a client request, e.g. a domain name resolution request, to the client DNS. The client DNS resolves the client request by providing the IP number of the LBS selector. The LBS selector is on the server side of the network. The LBS selector receives the forwarded client request from the client DNS. The LBS selector resolves the client request and provides the IP number of the LB server to the client DNS. The client DNS sends the client request to the LB server in response to the IP number provided by the LBS selector. The LB server examines the client request and the network measurements provided for the servers. Based on the network measurements and the client request, the LB server determines the best server for handling the client request. Once the determination is made by the LB server and a server is selected, the LB server provides an IP number to the client system. Using the provided IP number, the client system directs its request to that IP number. Therefore, a single LB server can be configured to operate within a single DNS.

Referring once more to FIG. 1, although only one LBS selector, LBS selector 15, is depicted, in another embodiment of the present invention, there are more than one LBS selectors. The multiple LBS selectors operate independently from each other and service or receive requests from several client systems. The multiple LBS selectors also communicate with some or all of the LB servers within the network. Since the LBS selectors operate independently from each other, an LBS selector can be assigned to receive request from a subset of client systems. This, in effect, segments the client systems and reduces the amount of network traffic or load on each of the LBS selectors within the network. For instance, LBS selector Z1 is connected with client systems A1–A10 and LBS selector Z2 is connected to client systems B1–B10 instead of only one LBS selector C1 being connected to client systems A1–A10 and client systems B1–B10. Hence, by segmenting or dividing the client systems and associating each segment of client systems with a different LBS selector, the amount of network traffic or load experienced by a single LBS selector is significantly reduced. Similarly, in another embodiment, the server DNS partitions the multiple LBS selectors among the multiple LB servers.

Additionally, with multiple LBS selectors, a second LBS selector can act as a backup to a first LBS selector. For instance, in a network with two LBS selectors F1 and B1, both LBS selectors can be configured to receive requests from the same client systems for the same LB servers. However, LBS selector F1 is active or operational and LBS selector is inactive although connected to the network. If LBS selector F1 becomes inoperable, LBS selector B1 is activated and thereby quickly replaces the LBS selector F1. As a result, the network is once again operational within a matter of minutes instead of hours or days.

Furthermore, with multiple LBS selectors, the LBS selectors can be configured operate in a sharing mode such that the load or network traffic experienced by any one LBS selector is significantly reduced. For instance, a first LBS selector A1 and a second LBS A2 both receive requests from a specific set of client systems for a specific set of LB servers. However, if the first LBS selector A1 becomes overloaded, e.g. the network traffic on the first LBS selector A1 exceeds a predetermined threshold such as 1M bits/sec, then the first selector A1 stops accepting requests from the client systems. The second LBS selector A2 assumes the handling of the requests from the client systems that was originally being handled by the first LBS selector. Similarly, the LBS selectors can be configured to operate in a sharing mode in a round robin fashion in an effort to reduce the load or network traffic experienced by any one LBS selector.

Accordingly, the present invention provides a load balancing system and method for a network using load balancing server selectors and/or load balancing servers. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A method of load balancing for a network, the network having a plurality of client systems and a plurality of servers, comprising:
    receiving a client request for a server from a client system;
    resolving the destination point of the client request;
    sending the client request to a load balancing server based on the resolved destination point;
    selecting one server out of a subset of the plurality of servers based on a predetermined criteria;
    providing a conduit to the client system and the selected server for transmission of the client request;
    receiving network measurements, the network measurements being a total amount of bytes of data received by each of the subset of the plurality of servers from the plurality of client systems and a total amount of bytes of data sent by each of the subset of the plurality of servers to the plurality of client systems over a predetermined time period and the network measurements received is the predetermined criteria; and
    dynamically switching between one of two modes based on load experienced by the load balancing server, a first mode being macro-mode and a second mode being micro-mode; and
    wherein the load balancing server, in micro-mode, monitors each request from the plurality of client systems and, in macro-mode, causes requests from the plurality of client systems to bypass the load balancing server and be sent directly from the plurality of client systems to the selected server.

2. The method of claim 1 wherein the predetermined criteria further comprises a load measurement of each server among the subset of the plurality of servers.

3. The method of claim 1 wherein the predetermined criteria further comprises a network measurement of network traffic experienced by each server among the subset of the plurality of servers.

4. The method of claim 1 further comprising forming groups of servers, each group of servers including a different subset of servers out of the plurality of servers.

5. The method of claim 1 further comprising determining the load on each server within the subset of the plurality of servers.

6. The method of claim 1 further comprising sending requests from the client system to the selected server.

7. The method of claim 1 wherein the request is a domain name resolution request, requesting to resolve a logical name to an IP address.

8. A load balancing system for a network, the network having a plurality of client systems and a plurality of servers, comprising:
    at least one load balancing server adapted to be coupled with the network; and
    at least one load balancing server selector coupled with the at least one load balancing server, the load balancing server selector adapted to receive requests from the client systems and to forward the requests to the at least one load balancing server, the at least one load balancing server selecting one server out of a subset of the plurality of servers based on a predetermined criteria and the requests from the client systems;
    wherein the at least one load balancing server is further configured to operate in one of two modes, a first mode being macro-mode and a second mode being micro-mode and the at least one load balancing server in micro-mode monitors the requests from the client systems and a portion of the requests are session specific.

9. The load balancing system of claim 8 wherein the predetermined criteria is a load measurement of each server among the subset of the plurality of servers.

10. The load balancing system of claim 8 wherein the predetermined criteria is an amount of network traffic experienced by each server among the subset of the plurality of servers.

11. The load balancing system of claim 8 wherein the requests from the client systems are domain name resolution requests, requesting to resolve a logical name to an IP address.

12. The load balancing system of claim 8 further comprising a plurality of client domain servers, and the load balancing server comprises a processor configured with a look up table of a series of IP addresses for the plurality of client domain name servers having a one to one correspondence with at least one IP address for the at least one load balancing server.

13. The load balancing system of claim 8 wherein the load balancing server selector comprises a processor configured with a look up table of a series of IP addresses for the plurality of servers having a one to one correspondence with a series of IP addresses for a plurality of load balancing servers.

14. The load balancing system of claim 8 wherein the load balancing server selector comprises a processor configured with a look up table of a series of IP addresses allocated to the at least one load balancing server having a one to one correspondence with a series of IP addresses for a plurality of servers.

15. The load balancing system of claim 8 further comprising a client domain name server, such that the requests from the client systems are sent to the client domain name server to resolve a logical name to an IP address.

16. The load balancing system of claim 15 further comprising a server domain name server, such that the requests from the client domain name server are sent to a server domain name server based upon a predetermined condition to resolve a logical name with an IP address.

17. The load balancing system of claim 16 wherein one of the client systems is a member of a domain; and the predetermined condition is a determination of whether the request from the client system is to a server that is not a member of the domain or not.

18. The load balancing system of claim 16 wherein the predetermined condition is a determination whether the client domain name server is able to resolve the requests from the client systems.

19. A load balancing server for a network, the network having a plurality of client systems and a plurality of servers, comprising:
   a processor configured to select one server out of a subset of the plurality of servers based on a predetermined criteria and requests from the client systems;
   a network interface adapted to be coupled with the network and the processor;
   wherein the network interface receives network measurements, the network measurements being a total amount of bytes of data received by each of the subset of the plurality of servers from the plurality of client systems and a total amount of bytes of data sent by each of the subset of the plurality of servers to the plurality of client systems over a predetermined time period and the network measurements received is the predetermined criteria used by the processor; and
   wherein the processor is further configured to operate in one of two modes, a first mode being macro-mode and a second mode being micro-mode and the processor in micro-mode monitors the requests from the plurality of client systems and a portion of the requests are session specific.

20. The load balancing server of claim 19 further comprising a load balancing server selector coupled with the network, and the network interface receives requests from the load balancing server selector.

21. The load balancing server of claim 19 wherein the processor is configured to send an IP address to the client systems representing one of the plurality of servers.

22. The load balancing server of claim 21 wherein the processor is configured to monitor a total number of requests from the plurality of client systems received by the load balancing server over a predetermined time period, such that the processor switches configuration to send a different IP address to one of the plurality of the client systems, and the different IP address represents a path from the client system to the load balancing server to one of the plurality of servers.

23. The load balancing server of claim 19 wherein the processor is configured to send an IP address to one of the plurality of the client systems, and the IP address represents a path from the client system to the load balancing server to one of the plurality of servers.

24. The load balancing server of claim 23 wherein the processor is configured to monitor a total number of requests from the plurality of client systems received by the load balancing server over a predetermined time period, and the processor switches configuration to send a different IP address to the client systems representing one of the plurality of servers.

25. A load balancing system for a network, the network having client systems and servers, the system comprising:
   at least one load balancing server adapted to be coupled with the network;
   at least one load balancing server selector coupled with the at least one load balancing server, the load balancing server selector adapted to receive requests from the client systems and to forward the requests to the at least one load balancing server, the at least one load balancing server selecting one server out of a subset of the servers based on a predetermined criteria and the requests from the client systems;
   wherein the at least one load balancing server is configured to dynamically switch between one of two modes based on load experienced by the at least one load balancing server, a first mode being macro-mode and a second mode being micro-mode; and
   wherein the at least one load balancing server, in micro-mode, monitors each request from the client systems and, in macro-mode, causes requests from the client systems to bypass the load balancing server and be sent directly from the client systems to the selected server.

26. The system of claim 25 wherein the load experienced comprises network measurements, the network measurements being a total amount of bytes of data received by each of the subset of the servers from the client systems and a total amount of bytes of data sent by each of the subset of the servers to the client systems over a predetermined time period.

27. The system of claim 26 wherein the load experienced comprises computation processing based on a total number of requests from the client systems received by the load balancing server over a predetermined time period to be processed by the load balancing server.

28. The system of claim 27 wherein the load balancing server, in macro mode, is configured to send an IP address that represents one of the servers to one of the client systems.

29. The system of claim 25 wherein the load balancing server is configured to switch from micro-mode to macro-mode when the load experienced by the load balancing server exceeds a predetermined limit.

30. The system of claim 29 wherein the predetermined limit is based on network measurements received by the load balancing server, the network measurements being a total amount of bytes of data received by each of the subset of the servers from the client systems and a total amount of bytes of data sent by each of the subset of the servers to the client systems over a predetermined time period.

31. The system of claim 30 wherein the predetermined limit is based on a total number of requests from the client systems received by the load balancing server over a predetermined time period to be processed by the load balancing server.

32. The system of claim 25 wherein the load balancing server is configured to switch from macro-mode to micro-mode when the load experienced by the load balancing server is less then or corresponds to a predetermined limit.

33. The system of claim 32 wherein the predetermined limit is based on an amount of network measurements received by the load balancing server, the network measurements being a total amount of bytes of data received by each of the subset of the servers from the client systems and a total amount of bytes of data sent by each of the subset of the servers to the client systems over a predetermined time period.

34. The system of claim 33 wherein the predetermined limit is based on a total number of requests from the client systems received by the load balancing server over a predetermined time period to be processed by the load balancing server.

* * * * *